United States Patent [19]
Lewis

[11] 3,745,690
[45] July 17, 1973

[54] SELF SECURING SOCKET FOR FISHING ROD

[76] Inventor: Edgar R. Lewis, 6690 S.W. 98 St., Miami, Fla. 33156

[22] Filed: June 3, 1971

[21] Appl. No.: 149,616

[52] U.S. Cl. ............................................. 43/21.2
[51] Int. Cl. ........................................... A01k 97/10
[58] Field of Search ...................... 43/21.2, 22, 23

[56] References Cited
UNITED STATES PATENTS

| | | | |
|---|---|---|---|
| 2,018,923 | 10/1935 | Potter | 43/23 |
| 3,344,551 | 10/1967 | Chestnut | 43/21.2 |
| 2,899,769 | 8/1959 | Niles | 43/21.2 |
| 2,456,681 | 12/1948 | Culver | 43/22 |
| 3,159,366 | 12/1964 | Knight | 43/21.2 |

Primary Examiner—Warner H. Camp
Attorney—Lloyd J. Andres

[57] ABSTRACT

A tubular socket member adapted to be secured to an inside surface of a boat for receiving and holding upright a fishing rod by the handle end thereof including a conical wedge member slidably retained on the rod for manual wedging engagement within the socket when the slotted handle end of the rod is selectively engaged in one of four rotated positions on a transverse pin secured in the lower end portion of the socket including a bumper on the lower portion of the handle of the rod for disengaging the conical wedge and the rod from the socket when the rod is manually moved upward a predetermined distance.

1 Claim, 4 Drawing Figures

PATENTED JUL 17 1973
3,745,690
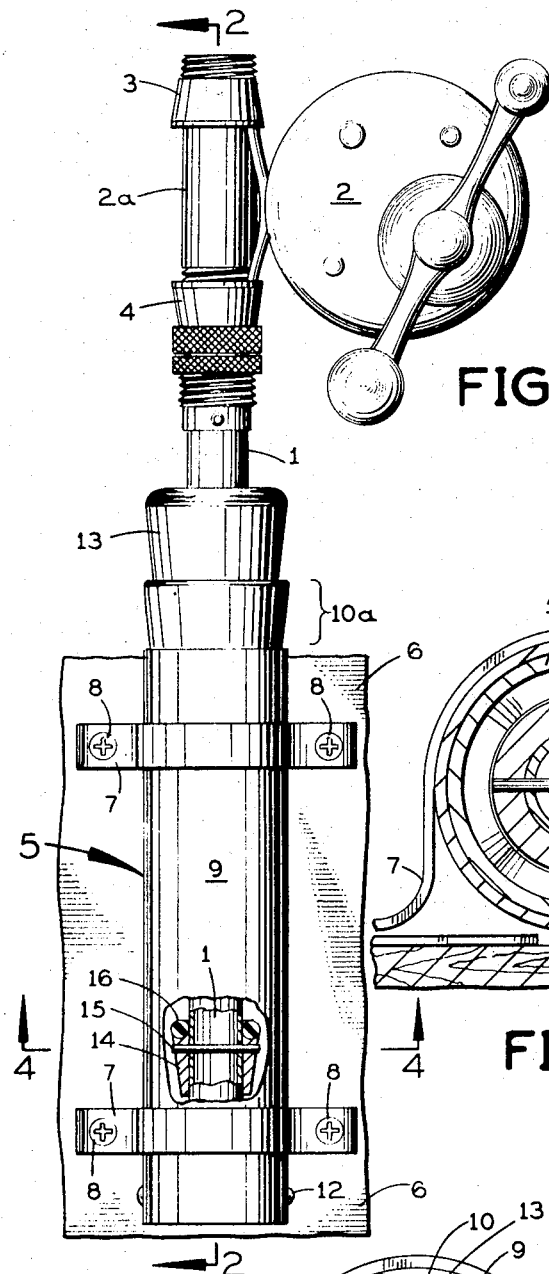
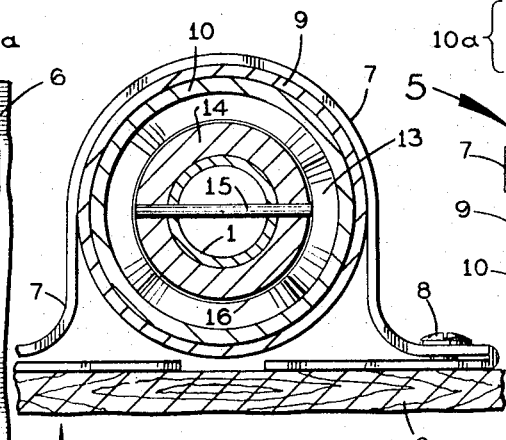
FIG. 1
FIG. 4
FIG. 3
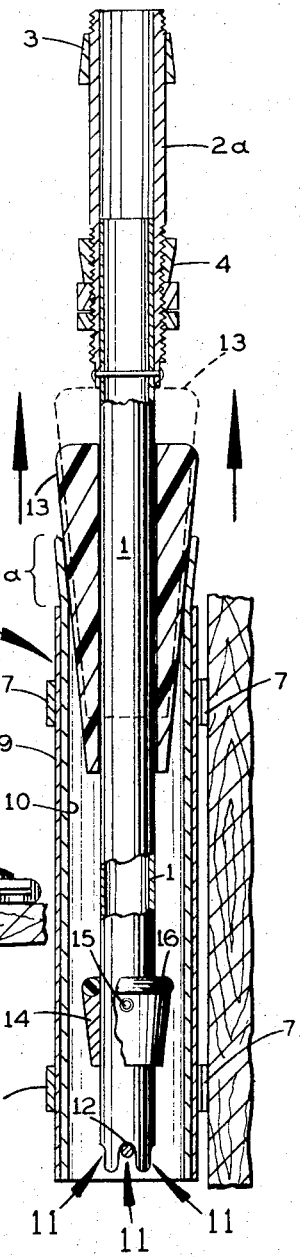
FIG. 2
INVENTOR.
EDGAR R. LEWIS
BY Lloyd Sanders

SELF SECURING SOCKET FOR FISHING ROD

This invention relates in general to fishing tackle and more particularly to a conventional fishing rod usually including a reel and more particularly a holder for the rod in a substantially vertical position in a fixed socket by wedging means.

Prior to this invention sockets for temporarily storing or trolling would not secure the lower end of the rod, other than by gravity, and as a result an expensive rod and reel were often lost overboard due to rough water or other accidental mishandling.

The present invention overcomes the above objections and disadvantages by the provision of a socket in which the simple depression of a conical wedge secures the rod in a substantially vertical position and prevents the rotation of the rod in the socket, which feature is particularly helpful in the case of trolling, and which construction is a principal object of the invention.

Another object of the invention is the provision of a tubular socket means including clamp means for securing the socket means in substantially vertical position on a side wall of the boat. The socket has a transverse pin in the extreme lower end thereof for engaging the lower end of the rod in each of four positions to prevent rotation thereof and a conical wedge of plastic material coaxially and slidably retained for reciprocation on the lower end portion of the rod for firmly securing same in the socket.

These and other objects and advantages in one embodiment of the invention are described and shown in the following specification and drawing, in which:

FIG. 1 is a fragmentary side elevation of a rod and reel releasably retained in a socket secured substantially vertical to the inside surface of a boat.

FIG. 2 is a cross sectional elevation taken through section line 2—2, FIG. 1.

FIG. 3 is an enlarged cross sectional bottom plan view of the socket shown in FIG. 1.

FIG. 4 is a cross sectional bottom view taken through section line 4—4, FIG. 1.

Referring to FIGS. 1 and 2, a fishing rod 1 has a reel 2 secured on portion 2a by adjustable collars 3 and 4 and is retained in a socket assembly 5 secured to a substantially plain surface 6 by clamps 7—7 by means of screw fasteners 8.

Referring to FIGS. 2 and 3, the socket assembly 5 consists of an outer tube 9 and a coaxial inner tube 10 with the upper end portion of the latter terminating in an extended divergent cone 10a. The lower end of the rod 1 has a pair of transverse like slots 11—11 at right angles to each other, which slidably engage a transverse pin 12 which extends through both tubes 9 and 10 and is riveted therein. It is therefore apparent that the rod may be placed in the holder in each of four positions to suit the user. A downward convergent conical plastic plug 13, such as nylon, has a coaxial bore therethrough for a sliding fit on rod 1.

A bumper bushing 14 is secured to the lower end portion of the rod by a pin 15, which is preferably a "Rollpin," and serves as a seat for an elastomer bumper 16 resting on the upper side thereof.

In operation, it is apparent that the rod 1 may be placed in the socket assembly 5 and the lower end engaged in a selected one of four positions of rotation with respect to pin 12. Then the plug 13 is manually pressed into tube 10, which will firmly secure the rod in this position against normal vibration or displacement.

When it is desired to remove the rod from the socket assembly the rod is rapidly moved upward and the bumper 16 will strike the lower end of the plug 13 which impact will release same from the tube and permit the free manual removal of the rod from the socket.

It is apparent that the inner and outer tubes 9 and 10 may be combined into a single tube, provided sufficient elasticity is available at the upper conical end to maintain a holding grip on the plug without the use of excessive downward force onto the plug.

I claim:

1. A socket for holding a fishing rod comprising a cylindrical tube of predetermined diameter and length including clamp means on the outside thereof adapted and constructed to secure said tube to a substantially vertical surface, said tube having the upper portion thereof flared into a uniform divergent conical shape at a predetermined angle with respect to the axis of said tube, a fishing rod having a handle means of predetermined length with a portion thereof of uniform cylindrical diameter, a transverse stop means in the lower end portion of said tube for supporting a fishing rod in said tube by the lower end of the handle thereof, a conical wedge of resilient plastic material having an included angle substantially equal to the said angle of said conical shape of said tube and a large diameter greater than the diameter of said tube and a small diameter smaller than the inner diameter of said tube, said conical wedge having a coaxial bore therethrough for free longitudinal slidable movement on said uniform diameter of said handle, a bumper member secured around said handle a predetermined distance from the end thereof with an elastomer positioned against the upper end thereof whereby the upward movement of said rod secured in said socket will move said bumper member to strike the lower end of said conical wedge and release same from its frictional engagement with said tube and permit the free removal of said rod from said socket.

* * * * *